US010796373B2

(12) United States Patent
Diefendorf et al.

(10) Patent No.: US 10,796,373 B2
(45) Date of Patent: *Oct. 6, 2020

(54) SYSTEM AND METHOD FOR PROVIDING INSURANCE COVERAGE RECOMMENDATIONS

(71) Applicant: Hartford Fire Insurance Company, Hartford, CT (US)

(72) Inventors: Tamara L. Diefendorf, Manchester, CT (US); Pallavi J. Patel, Plantsville, CT (US); Daniel F. McCoy, Coventry, CT (US); Kathyann Bentley, South Glastonbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 290 days.

This patent is subject to a terminal disclaimer.

(21) Appl. No.: 15/927,490

(22) Filed: Mar. 21, 2018

(65) Prior Publication Data

US 2018/0211328 A1 Jul. 26, 2018

Related U.S. Application Data

(63) Continuation of application No. 13/912,644, filed on Jun. 7, 2013, now Pat. No. 9,940,674, which is a continuation of application No. 12/555,873, filed on Sep. 9, 2009, now Pat. No. 8,478,613.

(60) Provisional application No. 61/102,187, filed on Oct. 2, 2008.

(51) Int. Cl.
*G06Q 40/08* (2012.01)
*G06Q 30/02* (2012.01)

(52) U.S. Cl.
CPC .......... *G06Q 40/08* (2013.01); *G06Q 30/02* (2013.01)

(58) Field of Classification Search
CPC ................ G06Q 40/08; G06Q 30/02
See application file for complete search history.

(56) References Cited

U.S. PATENT DOCUMENTS

| 7,860,786 B2 * | 12/2010 | Blackburn | G06Q 40/025 705/38 |
| 7,983,938 B1 * | 7/2011 | Hopkins | G06Q 40/12 705/4 |
| 8,073,714 B1 * | 12/2011 | Ball | G06Q 40/08 705/4 |
| 2002/0055906 A1 * | 5/2002 | Katz | G06Q 30/02 705/39 |

(Continued)

OTHER PUBLICATIONS

Everett, M. D., Anthony, M. S., & Burkette, G. (2005). Long-term care insurance: Benefits, costs, and computer models. Journal of U Financial Planning, 18(2), 56-68. Retrieved from https://search.proquest.com/docview/2175476197accountkM4753.*

(Continued)

*Primary Examiner* — Muriel S Tinkler
(74) *Attorney, Agent, or Firm* — McCormick, Paulding & Huber PLLC

(57) ABSTRACT

A dynamic computer system assists users in selecting insurance coverage types and levels appropriate for their present financial circumstances. The computer system includes a graphical user interface (GUI) representative of a user's financial data and coverage recommendations. The system may further access third party data to validate and enrich coverage determinations.

20 Claims, 17 Drawing Sheets

(56) References Cited

U.S. PATENT DOCUMENTS

2007/0233527 A1* 10/2007 Dillard .................. G06Q 40/08
705/4

OTHER PUBLICATIONS

McMahon, W. W. (1957). A Theoretical and Statistical Analysis of Consumer Investment (Order No. 0022091). Available from ProQuest Dissertations & Theses Global. (301941944). Retrieved from https://search.proquest.com/docview/3019419447accountidV=14753.*

* cited by examiner

| State | Basic Coverage<br>If assets are < or = to $100,000 | Standard Coverage<br>If assets are = to $100,001-$300,000 | Superior Coverage<br>If assets are = to $300,001-$500,000 | Superior Coverage<br>If assets are >$500,000+ |
|---|---|---|---|---|
| | Comments Below | | | |
| STATE X | BI LIMIT = $50,000 / $100,000<br>PD LIMIT = $50,000<br>UM/UIM LIMIT = $50,000 / $100,000<br>MED PAY LIMIT = Y then $5,000<br>MED PAY LIMIT = N then $10,000<br>UMPD LIMIT = $25,000<br>COMP DEDUCTIBLE = $250 DEDUCTIBLE<br>COLLISION DEDUCTIBLE = $500 DEDUCTIBLE | BI LIMIT = $100,000 / $300,000<br>PD LIMIT = $50,000<br>UM/UIM LIMIT = $100,000 / $300,000<br>MED PAY LIMIT = Y then $5,000<br>MED PAY LIMIT = N then $10,000<br>UMPD LIMIT = $50,000<br>COMP DEDUCTIBLE = $250 DEDUCTIBLE<br>COLLISION DEDUCTIBLE = $500 DEDUCTIBLE | BI LIMIT = $250,000 / $500,000<br>PD LIMIT = $100,000<br>UM/UIM LIMIT = $250,000 / $500,000<br>MED PAY LIMIT = Y then $5,000<br>MED PAY LIMIT = N then $10,000<br>UMPD LIMIT = $100,000<br>COMP DEDUCTIBLE = $250 DEDUCTIBLE<br>COLLISION DEDUCTIBLE = $500 DEDUCTIBLE | BI LIMIT = $250,000 / $500,000<br>PD LIMIT = $100,000<br>UM/UIM LIMIT = $250,000 / $500,000<br>MED PAY LIMIT = Y then $5,000<br>MED PAY LIMIT = N then $10,000<br>UMPD LIMIT = $100,000<br>COMP DEDUCTIBLE = $250 DEDUCTIBLE<br>COLLISION DEDUCTIBLE = $500 DEDUCTIBLE |
| STATE Y | BI LIMIT = $50,000 / $100,000<br>PD LIMIT = $50,000<br>UM/UIM LIMIT = $50,000 / $100,000<br>MED PAY LIMIT = Y then $5,000<br>MED PAY LIMIT = N then $10,000<br>COMP DEDUCTIBLE = $250 DEDUCTIBLE<br>COLLISION DEDUCTIBLE = $500 DEDUCTIBLE | BI LIMIT = $100,000 / $300,000<br>PD LIMIT = $50,000<br>UM/UIM LIMIT = $100,000 / $300,000<br>ADD DEATH BENEFIT = Y<br>MED PAY LIMIT = Y then $5,000<br>MED PAY LIMIT = N then $10,000<br>UMPD LIMIT = $50,000<br>COMP DEDUCTIBLE = $250 DEDUCTIBLE<br>COLLISION DEDUCTIBLE = $500 DEDUCTIBLE | BI LIMIT = $250,000 / $500,000<br>PD LIMIT = $100,000<br>UM/UIM LIMIT = $250,000 / $500,000<br>ADD DEATH BENEFIT = Y<br>MED PAY LIMIT = Y then $5,000<br>MED PAY LIMIT = N then $10,000<br>WORK LOSS BENEFIT = Y<br>UMPD LIMIT = $100,000<br>COMP DEDUCTIBLE = $250 DEDUCTIBLE<br>COLLISION DEDUCTIBLE = $500 DEDUCTIBLE | BI LIMIT = $250,000 / $500,000<br>PD LIMIT = $100,000<br>UM/UIM LIMIT = $250,000 / $500,000<br>ADD DEATH BENEFIT = Y<br>MED PAY LIMIT = Y then $5,000<br>MED PAY LIMIT = N then $10,000<br>WORK LOSS BENEFIT = Y<br>UMPD LIMIT = $100,000<br>COMP DEDUCTIBLE = $250 DEDUCTIBLE<br>COLLISION DEDUCTIBLE = $500 DEDUCTIBLE |
| STATE Z | BI LIMIT = $50,000 / $100,000<br>PD LIMIT = $50,000<br>UM/UIM LIMIT = $50,000 / $100,000<br>ADD DEATH BENEFIT = Y<br>MED PAY LIMIT = Y then $5,000<br>MED PAY LIMIT = N then $10,000<br>WORK LOSS BENEFIT = Y<br>UMPD LIMIT = $25,000<br>COMP DEDUCTIBLE = $250 DEDUCTIBLE<br>COLLISION DEDUCTIBLE = $500 DEDUCTIBLE | BI LIMIT = $100,000 / $300,000<br>PD LIMIT = $50,000<br>UM/UIM LIMIT = $100,000 / $300,000<br>ADD DEATH BENEFIT = Y<br>MED PAY LIMIT = Y then $5,000<br>MED PAY LIMIT = N then $10,000<br>WORK LOSS BENEFIT = Y<br>UMPD LIMIT = $50,000<br>COMP DEDUCTIBLE = $250 DEDUCTIBLE<br>COLLISION DEDUCTIBLE = $500 DEDUCTIBLE | BI LIMIT = $250,000 / $500,000<br>PD LIMIT = $100,000<br>UM/UIM LIMIT = $250,000 / $500,000<br>ADD DEATH BENEFIT = Y<br>MED PAY LIMIT = Y then $5,000<br>MED PAY LIMIT = N then $10,000<br>WORK LOSS BENEFIT = Y<br>UMPD LIMIT = $100,000<br>COMP DEDUCTIBLE = $250 DEDUCTIBLE<br>COLLISION DEDUCTIBLE = $500 DEDUCTIBLE | BI LIMIT = $250,000 / $500,000<br>PD LIMIT = $100,000<br>UM/UIM LIMIT = $250,000 / $500,000<br>ADD DEATH BENEFIT = Y<br>MED PAY LIMIT = Y then $5,000<br>MED PAY LIMIT = N then $10,000<br>WORK LOSS BENEFIT = Y<br>UMPD LIMIT = $100,000<br>COMP DEDUCTIBLE = $250 DEDUCTIBLE<br>COLLISION DEDUCTIBLE = $500 DEDUCTIBLE |

FIG. 16

SYSTEM AND METHOD FOR PROVIDING INSURANCE COVERAGE RECOMMENDATIONS

CROSS REFERENCE TO RELATED APPLICATIONS

This application is a continuation of prior application Ser. No. 13/912,644, filed on Jun. 7, 2013 and published as U.S. Patent Application Publication No. 2013/0268301, which is a continuation of prior application Ser. No. 12/555,873, filed on Sep. 9, 2009 and issued as U.S. Pat. No. 8,478,613, which claims the benefit of U.S. Provisional Patent Application No. 61/102,187 filed on Oct. 2, 2008, the entire contents of each are incorporated herein by reference.

BACKGROUND

The process for selecting and determining the correct insurance coverages for a consumer's home, automobile and other property is a cumbersome, difficult and time consuming task. Consumers are faced with many variations in insurance product offerings, a very large array of available coverage levels and differing state mandated coverage level requirements which to navigate through. For example, for any given coverage there may be many different variations in features and options such as in the case of automobile insurance amounts for bodily injury coverage, property damage coverage, medical payment coverage, uninsured/underinsured motorist coverage, etc. Selecting the appropriate combinations and levels for each of these coverages to fit an individual's personal financial situation is a very difficult task.

Accordingly, consumers cannot readily and accurately determine what coverage levels would be appropriate for their personal circumstances. For example, recommended coverage levels vary greatly based on each specific individual's personal assets and income levels in conjunction with the underlying state mandated coverage requirements. Current systems and engines only provide very generalized recommendations based on a basic rudimentary analysis of each individual. In these prior art systems, many factors crucial to making accurate personalized coverage offerings are typically not considered. Furthermore, prior art systems do not supplement or validate the personal financial information to provide more accurate coverage recommendations for an individual consumer. Accordingly, it would be desirable to have a way to provide consumers with accurate recommendations for insurance coverage levels in an intuitive, user friendly and efficient manner.

SUMMARY

The present application is generally directed to computer systems and computer-implemented methods for centrally coordinating various information sources and delivering Web pages to Web browsers. More specifically, the computer systems and computer-implemented methods are configured to centrally manage the generation of insurance coverage recommendations for a property/casualty insurance policy that is in compliance with the latest state insurance regulations. The storage and maintenance of state insurance coverage guidelines is centralized. Further, the logic and process for generating insurance coverage recommendations for adequately protecting a consumer's assets is also centralized. The claimed systems and methods allow a remote user to make on-demand requests for insurance coverage recommendations for a specified state via a Web browser. Insurance coverage recommendations are delivered to the remote user via Web pages on the remote user's Web browser. Advantageously, because the storage and maintenance of state insurance coverage guidelines and the logic and process for generating insurance coverage recommendations are centralized, the process of generating insurance coverage recommendations can be easily updated on a system wide basis to deliver Web pages to Web browsers in a consistent and uniform way.

In one embodiment, a system for delivering Web pages to Web browsers comprises a computer server including a storage unit and a recommendation server. The recommendation server comprises a data input/output module, a communication module, a graphical user interface module, and a third party data module. The communication module is connected to a communications network and communicates with at least one remote device and a plurality of external databases via the communications network. The third party data module communicates with the plurality of external databases to receive coverage guidelines for one or more coverage parameters for a property/casualty insurance policy in a plurality of states. The storage unit stores the coverage guidelines for the plurality of states in a table. The graphical user interface module renders a dynamic web-based graphical user interface on the at least one remote device. The data input/output module communicates with the at least one remote device to receive state residence information via the dynamic web-based graphical user interface. The recommendation server identifies selected stored coverage guidelines from the table corresponding to the received state residence information. The data input/output module communicates with the at least one remote device to receive financial information about a consumer's income and another class of assets via the dynamic web-based graphical user interface. The recommendation server assigns a relative weight to the consumer's income and other class of assets. The recommendation server generates one or more recommended values for the one or more coverage parameters for the property/casualty insurance policy based at least in part on the financial information about the consumer's income and other class of assets received from the at least one remote device, the relative weight assigned to the consumer's income and other class of assets, and the identified coverage guidelines from the table corresponding to the received state residence information. The graphical user interface module displays on the dynamic web-based graphical user interface the recommended values for the one or more coverage parameters for the property/casualty insurance policy generated by the computer server.

In another embodiment, a computer-implemented method for delivering Web pages to Web browsers comprises providing a computer server including a storage unit and a recommendation server, the recommendation server comprising a data input/output module, a communication module, a graphical user interface module, and a third party data module. The communication module communicating with a remote device and a plurality of external databases via a communications network. The third party data module communicating with the plurality of external databases to receive coverage guidelines for one or more coverage parameters for a property/casualty insurance policy in a plurality of states. The storage unit storing the coverage guidelines for the plurality of states in a table. The graphical user interface module rendering a dynamic web-based graphical user interface on the at least one remote device. The data input/output module communicating with the at least one remote device to receive state residence information via the dynamic web-based graphical user interface. The recommendation server identifying selected stored coverage guidelines from the table corresponding to the received state residence information. The data input/output module communicating with the remote device to receive financial information about a consumer's income and another class of assets via the dynamic web-based graphical user interface. The recommendation server assigning a relative weight to the consumer's income and other class of assets. The recommendation server generating one or more recommended values for the one or more coverage parameters for the property/casualty insurance policy based at least in part on the financial information about the consumer's income and other class of assets received from the at least one remote device, the relative weight assigned to the consumer's income and other class of assets, and the identified coverage guidelines from the table corresponding to the received state residence information. The graphical user interface module displaying on the dynamic web-based graphical user interface the one or more recommended values for one or more coverage parameters generated by the computer server.

In another embodiment, a system for delivering Web pages to Web browsers comprises a communication device that receives and transmits information, a recommendation server coupled to the communication device and a plurality of external databases, and a storage device in communication with the recommendation server. The recommendation server comprises a data input/output module, a graphical user interface module, and a third party data module. The third party data module communicates with the plurality of external databases to receive coverage guidelines for one or more coverage parameters for a property/casualty insurance policy in a plurality of states. The storage device stores the coverage guidelines for the plurality of states in a table. The graphical user interface module renders a dynamic web-based graphical user interface on the at least one remote device. The data input/output module communicates with the at least one remote device to receive state residence information via the dynamic web-based graphical user interface. The recommendation server identifies selected stored coverage guidelines from the table corresponding to the received state residence information. The data input/output module communicates with the at least one remote device to receive financial information about a consumer's income and another class of assets via the dynamic web-based graphical user interface. The recommendation server generates one or more recommended values for the one or more coverage parameters for the property/casualty insurance policy based at least in part on the financial information about the consumer's income and other class of assets received from the at least one remote device, the relative weight assigned to the consumer's income and other class of assets, and the identified coverage guidelines from the table corresponding to the received state residence information. The graphical user interface module renders on the dynamic web-based graphical user interface the recommended values for the one or more coverage parameters for the property/casualty insurance policy generated by the processor.

A technical effect of some embodiments of the invention is automated and enhanced coverage recommendation processing. With this and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 9 is another exemplary graphical user interface screen display delivered or rendered by a server according to some embodiments of the present invention.

FIG. 11 is another exemplary graphical user interface screen display delivered or rendered by a server according to some embodiments of the present invention.

FIG. 16 is an exemplary guideline for performing coverage recommendations in accordance with the present invention.

DETAILED DESCRIPTION

Figure 1:
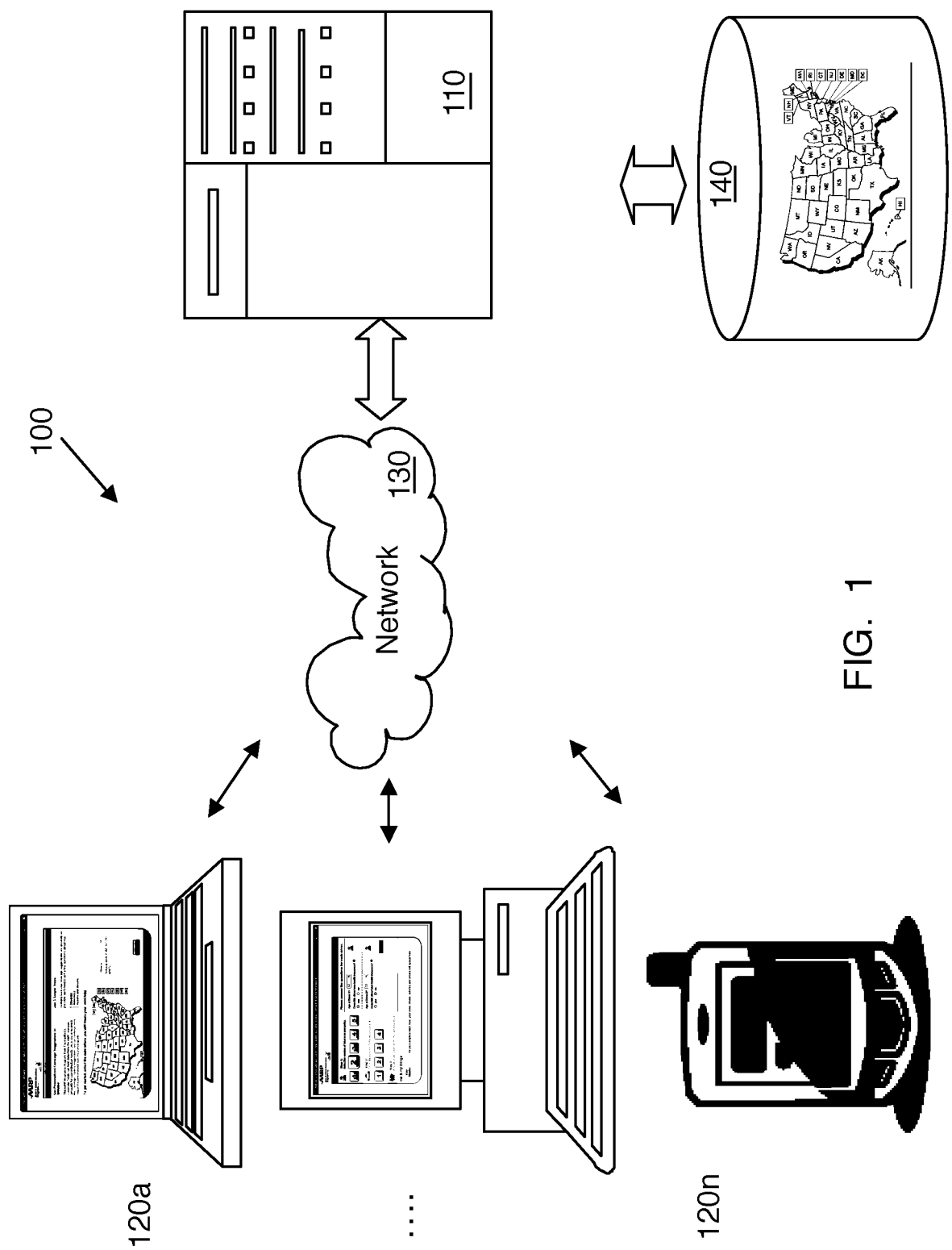
FIG. 1 illustrates an exemplary system architecture within which some embodiments of the present invention may be implemented.

FIG. 1 is block diagram of a dynamic coverage recommendation system 100 according to some embodiments of the present invention. System 100 administers an intuitive, efficient and intelligent tool for providing consumers with quick and accurate insurance coverage recommendations or suggestions via an easy to use interface. As shown, intelligent coverage recommendation system 100 includes at least one computer server 110 which is in communication with a number of client devices or entities 120a-n via a communications network 130. Devices or entities 120a-n could comprise, for example, a Personal Computer (PC), a portable computing device such as a Personal Digital Assistant (PDA), a terminal, a television, a portable phone, a cell phone or any other appropriate storage and/or communication device to exchange insurance-related information via a web site and/or a communication network. As used herein, devices may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Each device, module or component within the system may be connected over a network or may be directly connected. One skilled in the art will recognize that the terms "network," "computer network," and "online" may be used interchangeably and do not imply a particular network embodiment or topography. In general, any type of network (e.g., LAN, WAN, or Internet) may be used to implement the online or computer networked embodiment of the present invention. The network may be maintained by a server or combination of servers, or the network may be serverless. Similarly, any type of protocol (e.g., HTTP, FTP, ICMP, UDP, WAP, SIP, H.323, NDMP, TCP/IP) may be used to communicate across the network. Note that any devices described herein may communicate via one or more such communication networks.

Computer server 110 may be in further communication with or coupled to one or more data sources 140 such as one or more state insurance department databases, state property databases, credit databases, financial software databases, asset allocation databases, etc. to facilitate the provision of the insurance coverage recommendations. Although a single server is shown in FIG. 1, any number of servers may be included in the system 100. Similarly, any number of devices (and any other devices described herein) may be included according to embodiments of the present invention.

Server 110 may comprise one or more servers adapted to receive, store, process and/or transmit coverage related recommendation information associated with clients and/or data. In various embodiments, server 110 encompasses one or more Web servers which may be accessible to the client devices 120a-n via the Internet. A Web server may be a computer system which includes specialized software for delivering (serving) Web pages to Web browsers running on one or more client devices. In embodiments herein, the server software may include a web server for delivering or serving web pages incorporating the graphical user interfaces or GUIs described herein. The user interface provided may comprise instructions written in HTML, HDML, WML, XML, Javascript and the like. In addition, the user interface software may include a Java applet. The serving software may include a Java servlet for rendering at least a portion of the graphical user interface. In other embodiments server 100 may encompass multiple interconnected servers. More specifically, a software infrastructure may be provided that represents multiple interconnected physical and/or virtual servers as a single logical server. The single logic server is dynamically allocated to the multiple virtual servers. Each of these virtual servers includes an operating system and a virtual machine for providing the graphical user interfaces of the present invention.

A customer or consumer (such as a current or potential policy holder) may operate at least one client device 120a to initiate a coverage determination with an entity such as an insurance or financial services company operating or controlling computer server 110. Pursuant to some embodiments, a number of different types of client devices 120 may be used to initiate a claim. For example, client device 120 may be a telephone, a handheld, terminal, portable or desktop computer, a kiosk, a wireless handset, or the like. Each client device 120 may initiate communication with server 110 via communications network 130. Communications network 130 may include one or more of, or a combination of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Client devices may communicate via one or more such communication networks. It is contemplated that client devices may also include one or more input devices, such as a mouse and/or a keyboard, for accepting delivering inputs from a user. Similarly, one or more output devices, such as a monitor and/or a printer, may be provided within, or be accessible from, the client device. System 100 is configured to provide intelligent, accurate and efficient coverage recommendations for clients in a friendly and easy to use environment as discussed in more detail later herein.

Figure 2:
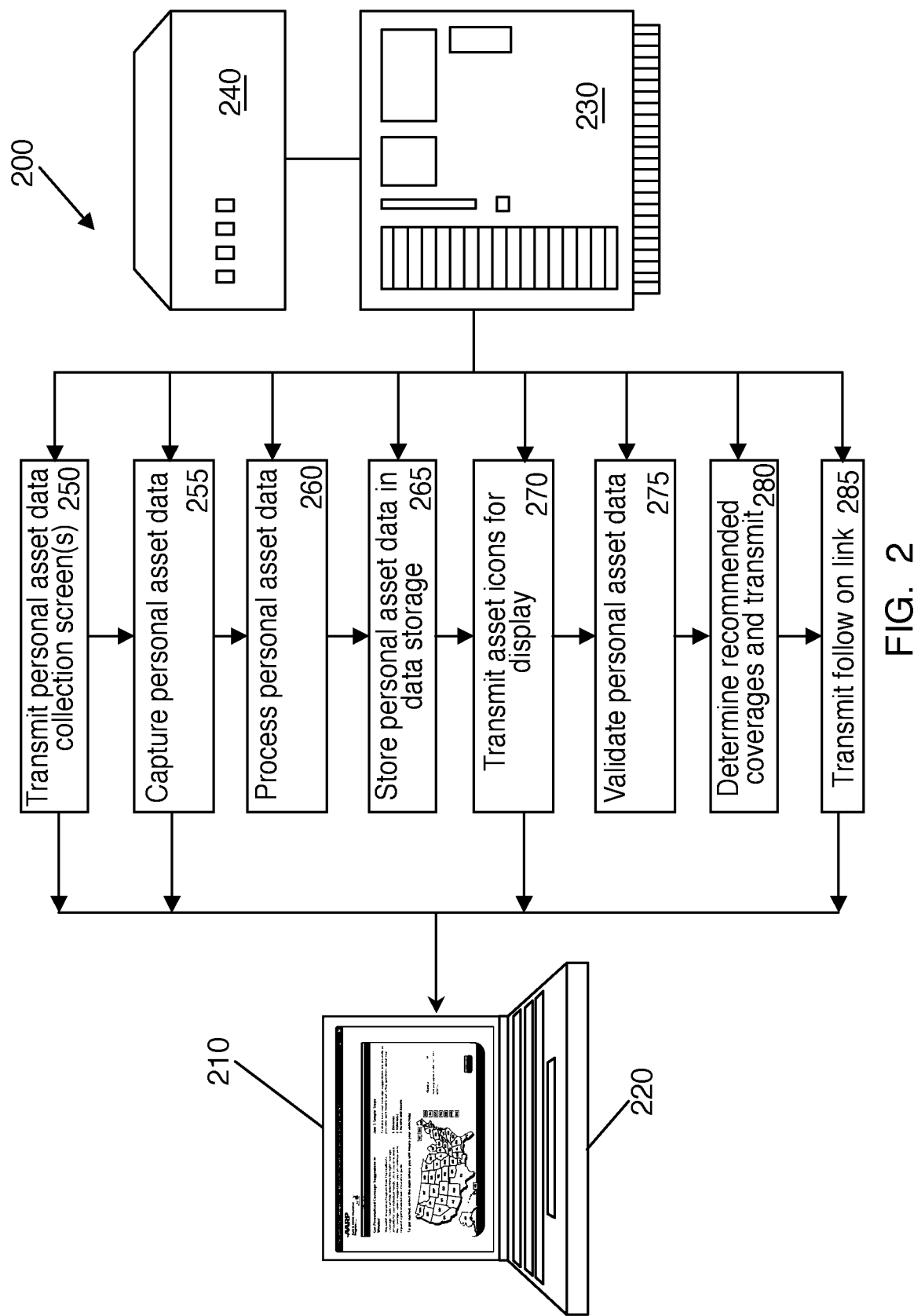
FIG. 2 is an exemplary computerized system and method according to some embodiments of the present invention.

Referring now to FIG. 2, a system 200 for providing a dynamic graphical user interface 210 including insurance coverage related Web pages, according to an embodiment of the present invention, may include a client workstation 220 and a Web server 230. The workstation 220 may include a conventional Web browser, which is capable of communicating with the Web server 230 using internet based protocols and communications schemes. Web server 230 is further coupled to at least one storage unit 240 for storing coverage and client related information. In one embodiment, Web server 230 is configured to implement a method as shown in steps 250-285.

Referring still to FIG. 2, at a step 250 the server 230 effectuates a transmission or serves up a web page for personal financial asset data collection, which are adapted for display by client workstation 220. The personal asset data is captured at a step 255, processed at a step 260, and stored, such as in storage unit 240, at a step 265. One or more asset representative icons are transmitted for display at a step 270. At a step 275 the personal asset data is validated. At a step 280, one or more coverage recommendations are determined and transmitted for display by client workstation 220. In one embodiment, a follow on link, such as a link to proceed to a quoting interface or a link to a cross selling related page or interface, is provided to the client at a step 285.

Steps 250-285 and all other processes mentioned herein may be embodied in processor-executable program instructions read from one or more computer-readable media, such as a floppy disk, a CD-ROM, a DVD-ROM, a Zip™ disk, and a magnetic tape, and then stored in a compressed, uncompiled and/or encrypted format. In some embodiments, hard-wired circuitry may be used in place of, or in combination with, program instructions for implementation of processes according to some embodiments. Embodiments are therefore not limited to any specific combination of hardware and software.

Figure 3:
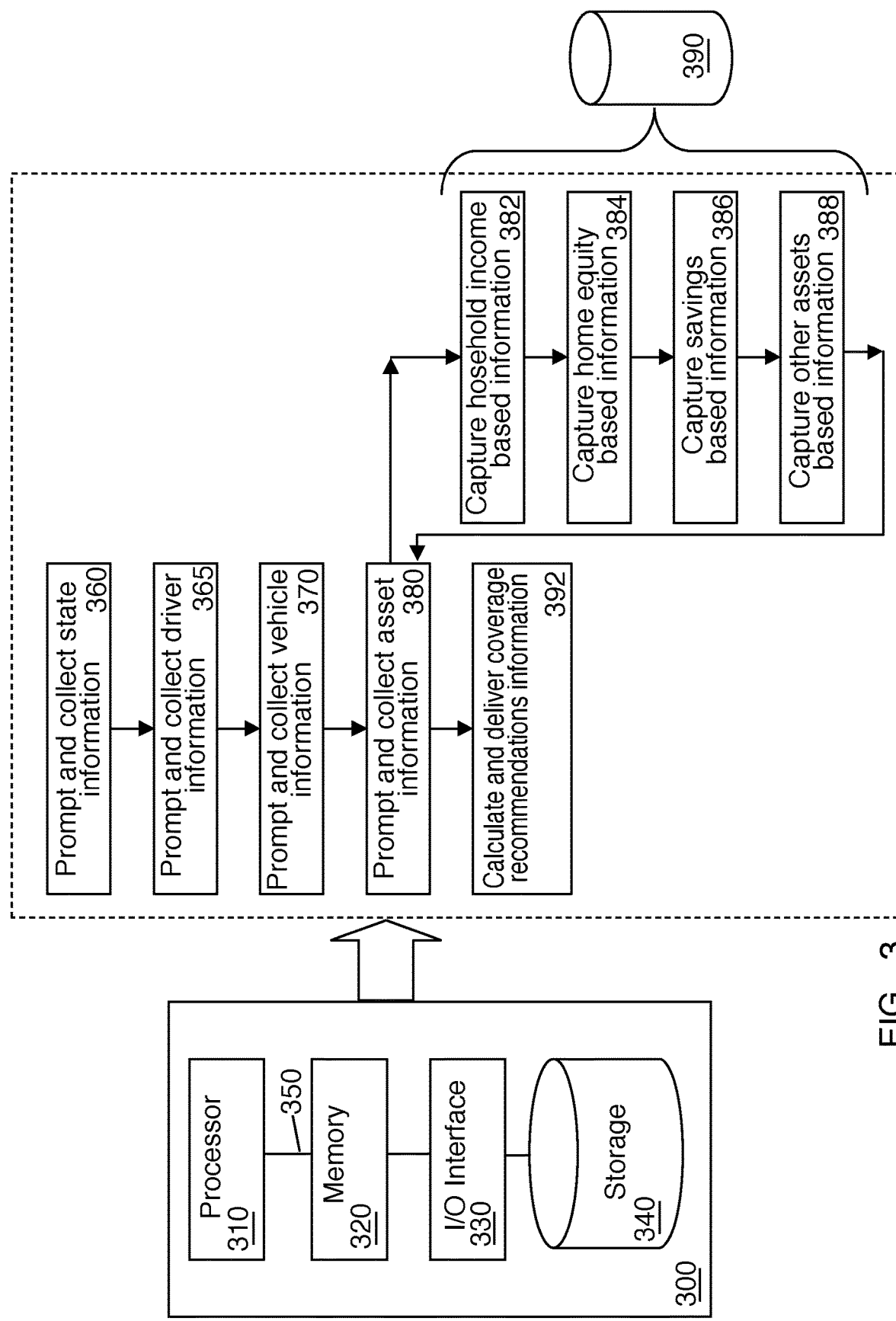
FIG. 3 is an exemplary computer implemented method according to some embodiments of the present invention.

Referring now to FIG. 3, another embodiment of the present invention is shown whereby a computer server or client computer 300 running a thick client application renders a series of input screens for viewing and input from a customer or consumer. Server or client computer 300 may include a processor 310, e.g. CPU, a memory 320, an I/O interface 330, and a storage mechanism 340 coupled together via a system bus 350 over which the various elements may interchange data and information. Computer 300 implements steps 360-390 in accordance with the present invention.

In one embodiment, at a step 360, a client or user is prompted for state residence information and the information is collected. Such collected information may be received via I/O interface 330 and then stored in storage mechanism 340. The user is then prompted for driver related information and the information is collected at a step 365. The user is then prompted for vehicle related information and the information is collected at a step 370. The user is then prompted for asset related information and the information is collected at a step 380. Asset related information may be captured such as information related to household income 382; home equity based information 384; saving based information 386; and other asset based information 388. Additionally, household income information 382; home equity based information 384; saving based information 386 and other asset based information 388 may be supplemented or validated via one or more third party databases or information repositories 390. One or more coverage recommendations are then calculated and delivered at a step 392.

In one embodiment, each of the asset classes, income, home equity, savings and other assets may be equally or differentially weighted to affect the coverage recommendations based on one or more factors, such as residence state, type of vehicle, and a number of other demographic, geographic and economic factors. In one scheme, household income may allocated the most weighting in determining coverage recommendations. In another scheme, a consumer's savings may be allocated the most relative weight. The final coverage recommendations are a function of the blended weighting of the multiple asset classes such as the income, home equity, savings and other assets components. Referring still to FIG. 3, once the asset information has been collected, one or more coverage recommendations may be calculated and provided to the consumer.

Referring now to FIGS. 4-15, according to embodiments of the present invention, the server 110, the Web server 230, or the client computer 300 is configured to provide or deliver a series of graphical user interface screens in order to receive information about a client or customer and then provide intelligent coverage recommendations to the customer. The screens shown in FIGS. 4-12 are adapted to prompt and receive information or indicia about a customer, such as their home state, number of properties, such as vehicles, number of drivers in their household, whether they have health insurance, their annual income, their assets, their home equity and/or retirement assets. In interacting with the screens, a user may enter commands and information into a communication device or input device such as a keyboard and a pointing device, as previously illustrated in FIGS. 1 and 2. Other input devices may include a voice recognition device, microphone, a joystick, a game pad, a satellite dish, a scanner, or the like (not shown). These and other input devices are often connected to a processing unit through an input/output port that is coupled to the system bus, but may be connected by other interfaces, such as a parallel port, a game port or a universal serial bus (USB), such as generally illustrated in FIG. 3. A monitor or other type of display device is also connected to the system bus via an interface, such as a video adapter or other graphical interface. In addition to the monitor, the computer may include other peripheral output devices (not shown), such as speakers, printers, and other output device which may be suitable for printing coverage recommendations, etc.

The computer for interaction with the various graphical user interface screens may operate in a networked environment using logical connections to one or more remote computers, such as previously shown in FIG. 1. The remote computer may be a workstation, a server computer, a router, a peer device or other common network node, and typically includes many or all of the elements described relative to the computer. The logical connections may include a local area network (LAN) and a wide area network (WAN). Such networking environments are commonplace in homes, offices, enterprise-wide computer networks, intranets and the Internet.

Figure 4:
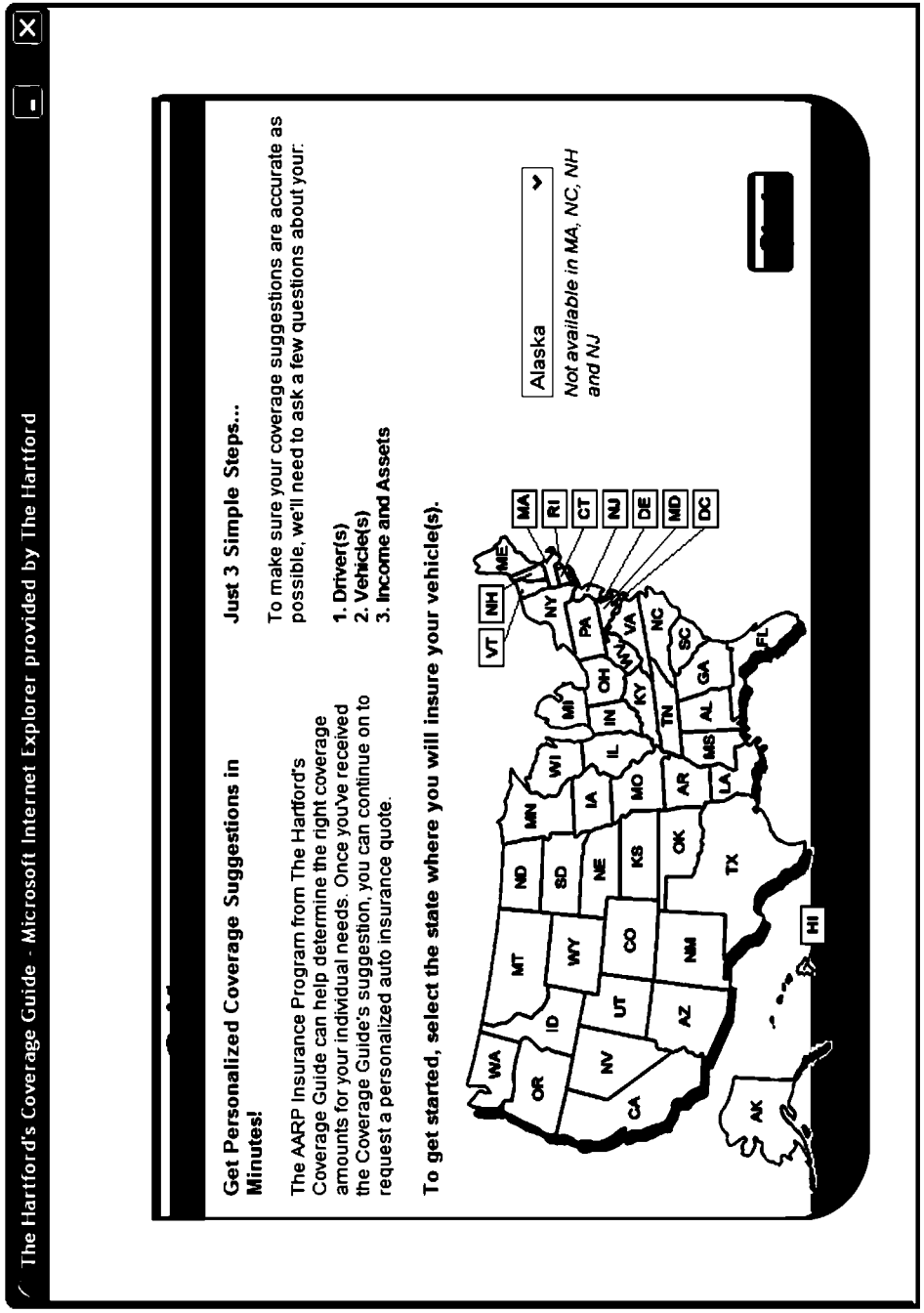
FIG. 4 is an exemplary graphical user interface screen display delivered or rendered by a server according to some embodiments of the present invention.

FIG. 4 shows an exemplary graphical user interface screen display 400 delivered or rendered by a server of the present invention for the client or user. A user may interact with graphical user interface screen display 400 to select their respective location or state of residence from a graphical representation of the states or applicable geographical regions.

Figure 5:
FIG. 5 is another exemplary graphical user interface screen display delivered or rendered by a server according to some embodiments of the present invention.

FIG. 5 shows another exemplary graphical user interface screen display 500 delivered or rendered by a server of the present invention for the client or user. A user may interact with graphical user interface screen display 500 to select the number of automobile drivers for the recommendation.

Figure 6:
FIG. 6 is another exemplary graphical user interface screen display delivered or rendered by a server according to some embodiments of the present invention.

FIG. 6 shows another exemplary graphical user interface screen display 600 delivered or rendered by a server of the present invention. A user may interact with graphical user interface screen display 600 to receive educational information related to the information collection process, such as why driver number information is collected.

Figure 7:
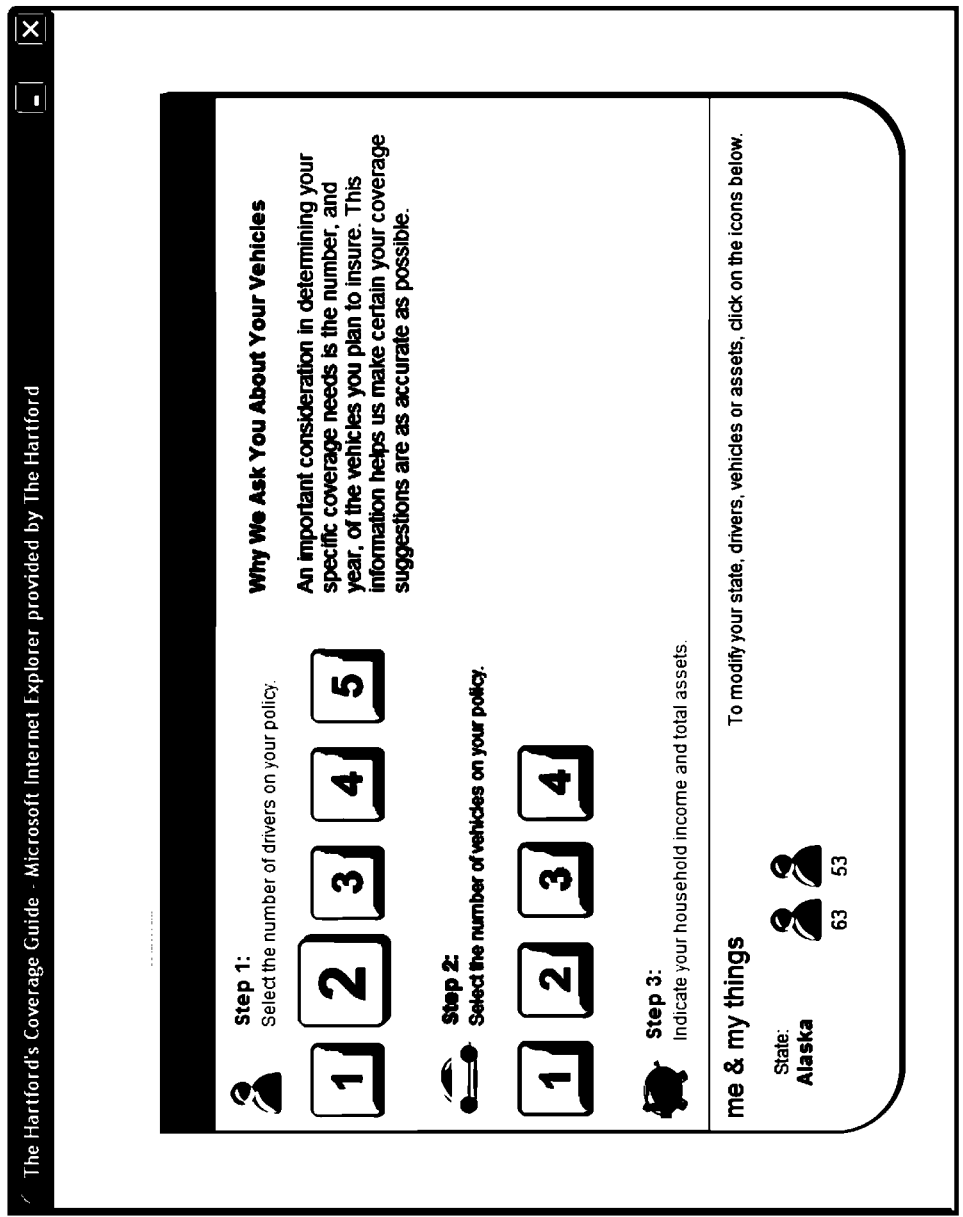
FIG. 7 is another exemplary graphical user interface screen display delivered or rendered by a server according to some embodiments of the present invention.

FIG. 7 shows another exemplary graphical user interface screen display 700 delivered or rendered by a server of the present invention for the client. A user may interact with graphical user interface screen display 700 to select the number of vehicles on the prospective policy or coverages.

Figure 8:
FIG. 8 is another exemplary graphical user interface screen display delivered or rendered by a server according to some embodiments of the present invention.

FIG. 8 shows another exemplary graphical user interface screen display 800 delivered or rendered by a server of the present invention. A user may interact with graphical user interface screen display 800 to provide more information about the vehicles such as information related to the model year and the financed/leased/owned status of the vehicle.

Figure 9:
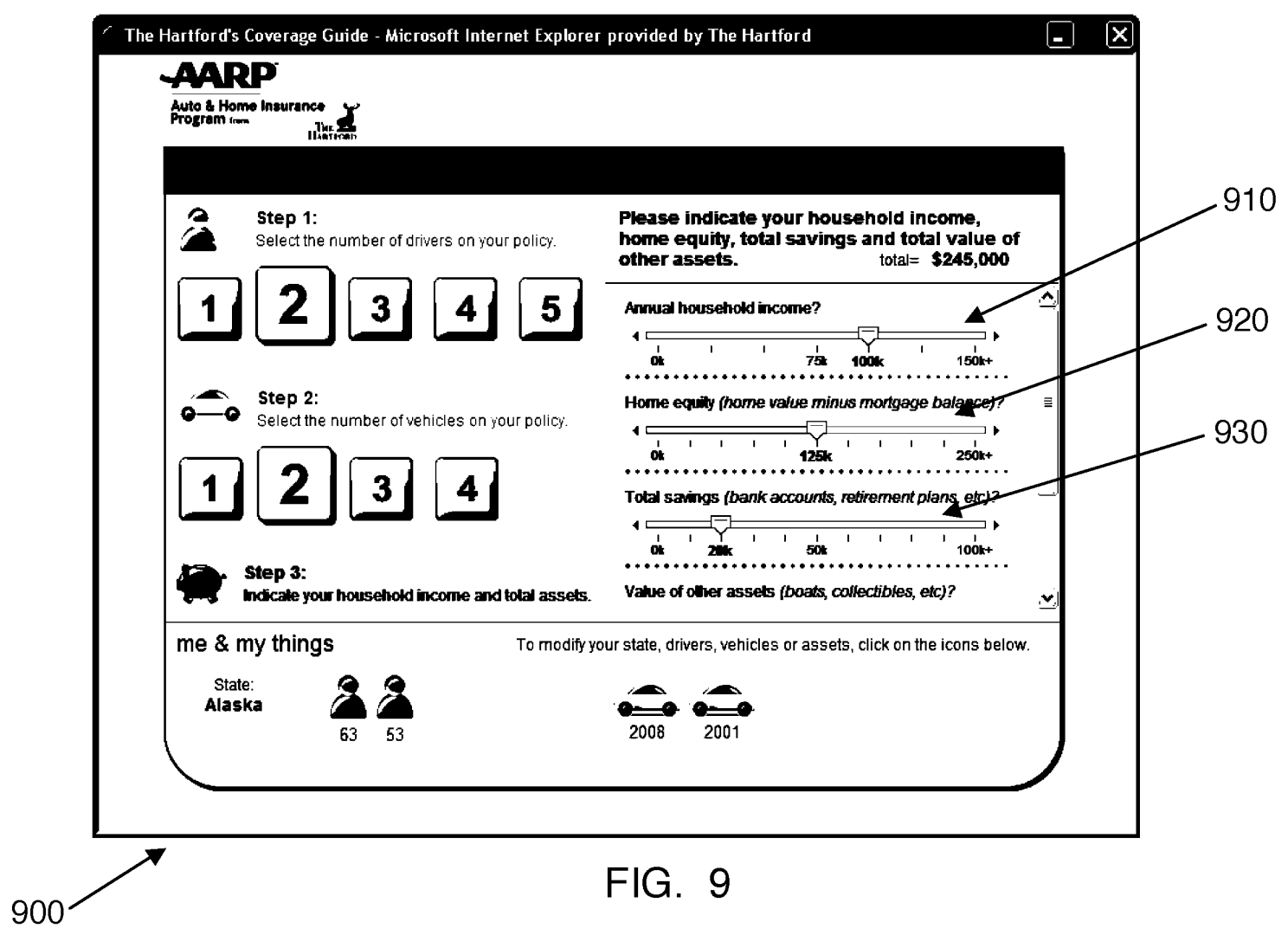
Figure 11:
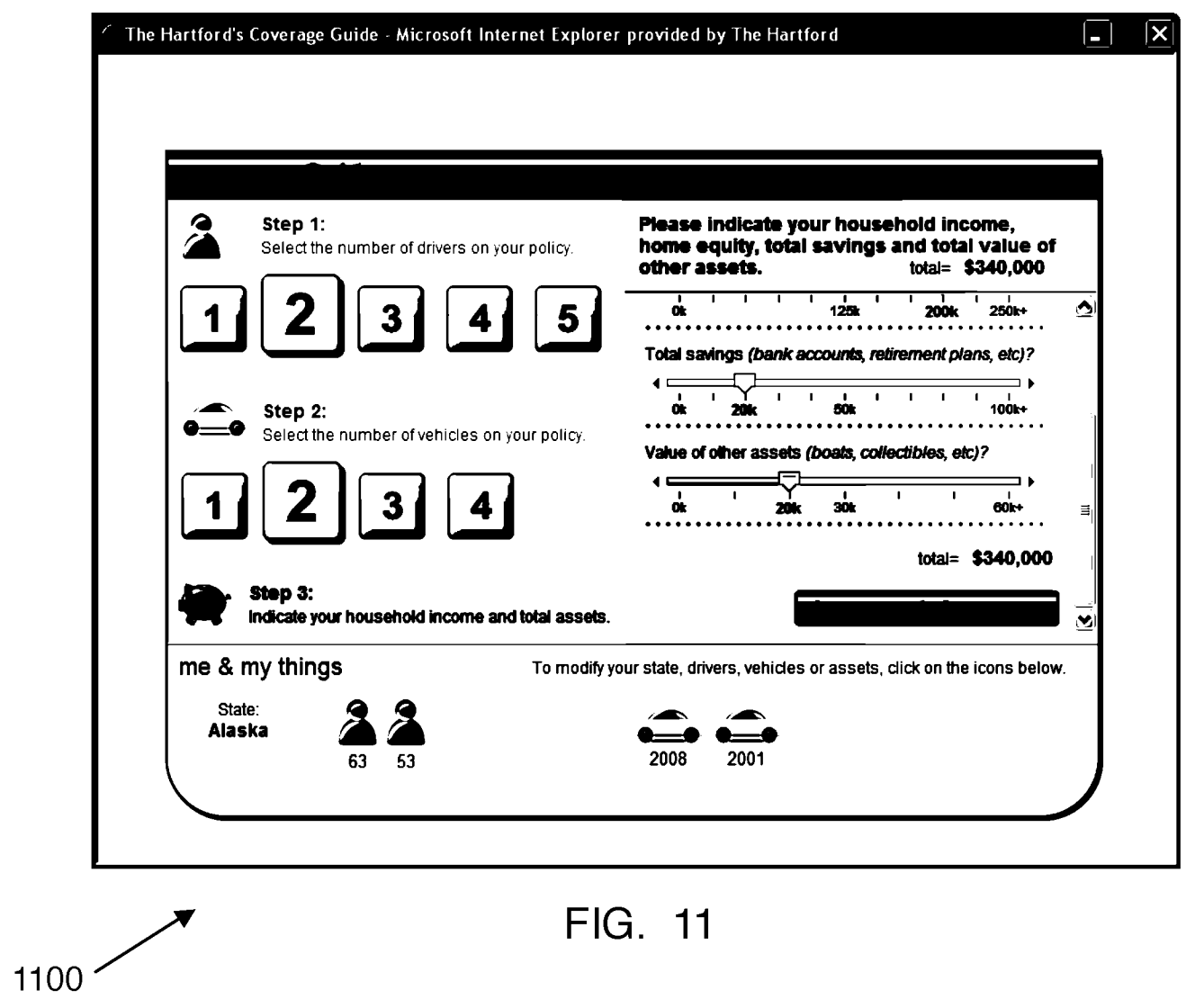

FIG. 9 shows another exemplary graphical user interface screen display 900 delivered or rendered by a server of the present invention. A user may interact with graphical user interface screen display 900 to provide asset based information via a series of dynamic visual sliders 910, 920, 930. For example, personal income may be represented by the slider 910; the slider 920 may represent home equity; and the slider 930 may represent other assets. In one embodiment, the sliders shown in FIGS. 9 and 11 are configured to operate dynamically. For example, as a user slides the income slider 910 to a higher income level, subsequent sliders 920, 930 may be adjusted dynamically in response to the higher income level selected. In one embodiment, the range of home equity selections displayed on the home equity slider 920 may be broadened based on the higher income levels selected by the income slider. By way of further example, the home equity slider 920 may affect one or more other sliders 910, 930. In one example, if the user selects a home equity value of over a certain threshold, e.g. such as $400,000, the other assets slider 930 may also be adjusted, for example, by providing a larger range of values to select from.

One or more of the sliders 910, 920, 930 may be configured to begin at a zero level or at one or more other pre-determined or dynamic levels for the user to adjust accordingly. In one example, if a user selects a relatively high level of income using the income slider 910, the home equity slider 920 may be dynamically adjusted from zero up to a higher level such as $100,000 based on the inference that a higher level of income may correlate to a higher level of home equity. In the present invention, third party data may be used to adjust the sliders dynamically. For example, based on the user's state selected and third party information about median house prices and/or median income in those states, the sliders may be adjusted accordingly based on external tax and/or property value databases. In another example, the data sources 140 may include a personal finance or bank database, which may be accessed to provide asset information for pre-setting or configuring the sliders to certain starting points or value ranges. A variety of third party links and connections may be provided in the interface to supplement the consumer information provided. For example, a third party connection may be provided to a payroll database or financial service database to pre-populate asset fields. Third party data sources may also be accessed to feed in additional information, e.g. house values, personal property valuations, retirement account values, etc.

In one embodiment of the present invention, a check box or other indicator may be provided in the case the customer does not have the asset requested, e.g. a renter would have no home equity. In this example, the system may provide alternate sliders or asset based questions for the consumer or simply not consider the asset in final coverage recommendation.

Figure 10:
FIG. 10 is another exemplary graphical user interface screen display delivered or rendered by a server according to some embodiments of the present invention.

FIG. 10 shows another exemplary graphical user interface screen display 1000 delivered or rendered by a server of the present invention. A user may interact with graphical user interface screen display 1000 to receive educational information about the asset information requested.

FIG. 11 shows another exemplary graphical user interface screen display 1100 delivered or rendered by a server of the present invention. A user may interact with graphical user interface screen display 1100 to provide additional asset based information such as the value of savings and value of other assets such as boats, collectibles, etc.

Figure 12:
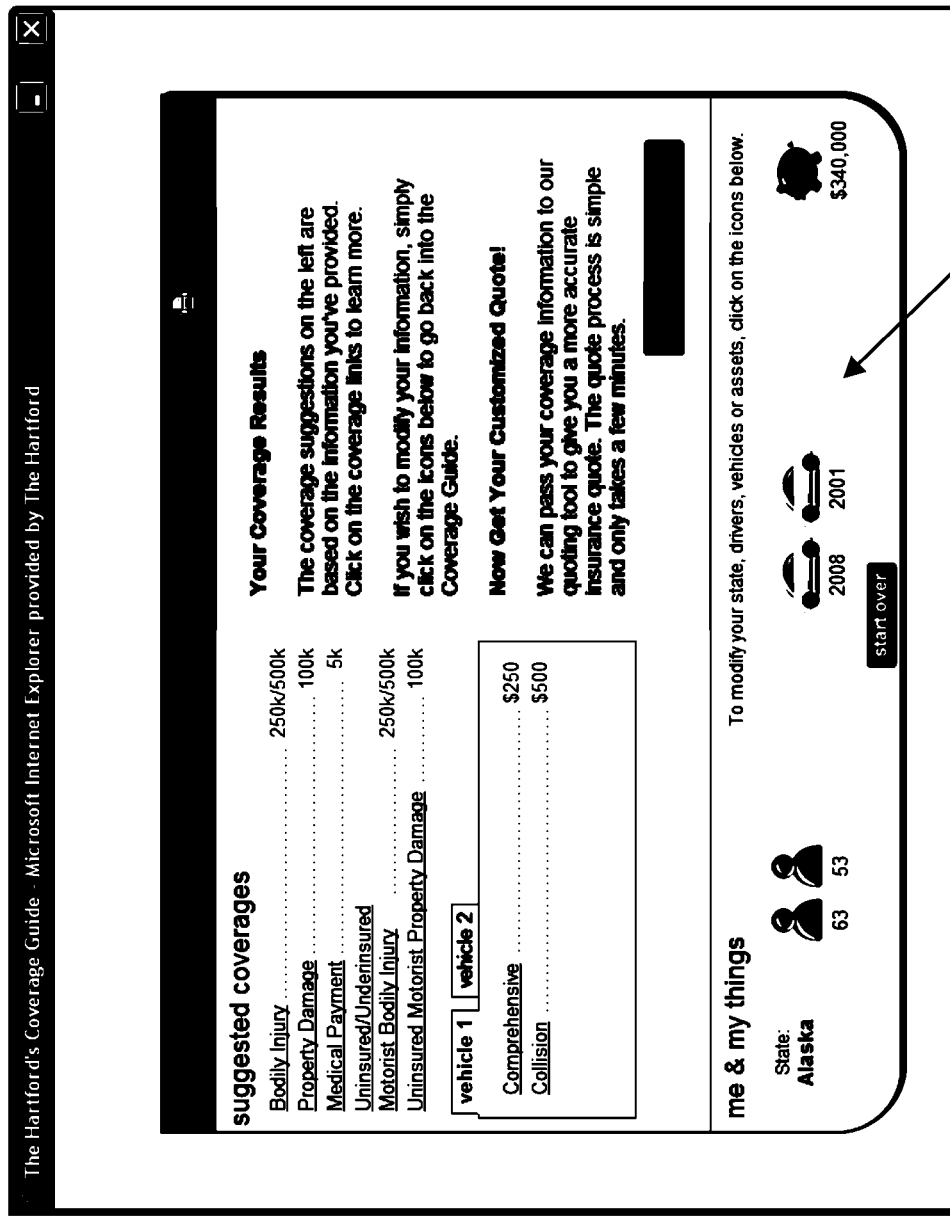
FIG. 12 is another exemplary graphical user interface screen display delivered or rendered by a server according to some embodiments of the present invention.

FIG. 12 shows another exemplary graphical user interface screen display 1200 delivered or rendered by a server of the present invention. A user may interact with graphical user interface screen display 1200 to view suggested or recommended coverages including a visual icon display 1210 which relates to the asset information provided. For example, visual icon display may contain visual indicia representative of the number of drivers, the number and type of automobiles and the value of assets for a specific consumer.

Figure 13:
FIG. 13 is another exemplary graphical user interface screen display delivered or rendered by a server according to some embodiments of the present invention.

FIG. 13 shows another exemplary graphical user interface screen display 1300 delivered or rendered by a server of the present invention. A user may interact with graphical user interface screen display 1300 to receive educational information about the suggested coverages.

Figure 14:
FIG. 14 is another exemplary graphical user interface screen display delivered or rendered by a server according to some embodiments of the present invention.

FIG. 14 shows another exemplary graphical user interface screen display 1400 delivered or rendered by a server of the present invention. A user may interact with graphical user interface screen display 1400 to receive an alternate informational display about coverages.

Figure 15:
FIG. 15 is another exemplary graphical user interface screen display delivered or rendered by a server according to some embodiments of the present invention.

FIG. 15 shows another exemplary graphical user interface screen display 1500 delivered or rendered by a server of the present invention. A user may interact with graphical user interface screen display 1500 to receive a follow on link to allow the consumer to obtain a binding quote related to the suggested coverages. It is contemplated that one or more pieces of information provided in the screens such as previously shown in FIGS. 4-11 can be passed along or transmitted with the follow on link.

One or more other referral or cross selling user interface screens may be initiated by data received from the coverage engine. For example, if a user indicates a high level of income and a high level of other assets, the user may be directed to screen related to an umbrella insurance policy. Umbrella determination may be accomplished via a series of dynamic sliders as described above. By way of further example, a high level of home equity selected by a user may direct the user to a home property insurance screen or may initiate a computer workflow such as the initiation of an email engine which would then communicate with the user about one or more recommendations for property insurance.

The present system may be partially automated with respect to collection of the personal information. In an embodiment in which the client device is a browser enabled telephone, client interface layer may operate to perform a reverse telephone lookup or in the case of a computer, the client's web address, etc, may be analyzed to identify the customer and some identifying information about the customer such as their home state. In some embodiments, a menu may request identifying information from the customer.

Referring to FIG. 16, some exemplary preliminary coverage recommendation guidelines 1600 in tabular format are shown for a number of exemplary state or geographical areas. These coverage recommendation guidelines 1600 are used by the present invention to determine and provide insurance coverage recommendations. For example, a number of coverage levels or grades such as basic coverage 1610, standard coverage 1620, superior coverage 1630 and superior coverage plus 1640 are shown which correspond to State X 1650, State Y 1660 and State Z 1670. Such information may be stored, for example, in a database such as storage facility 340 shown in FIG. 3. Alternatively, the system may access an external database, such as one provided by respective state insurance regulators or departments to obtain all or part of such coverage recommendation guidelines 1600.

Figure 17:
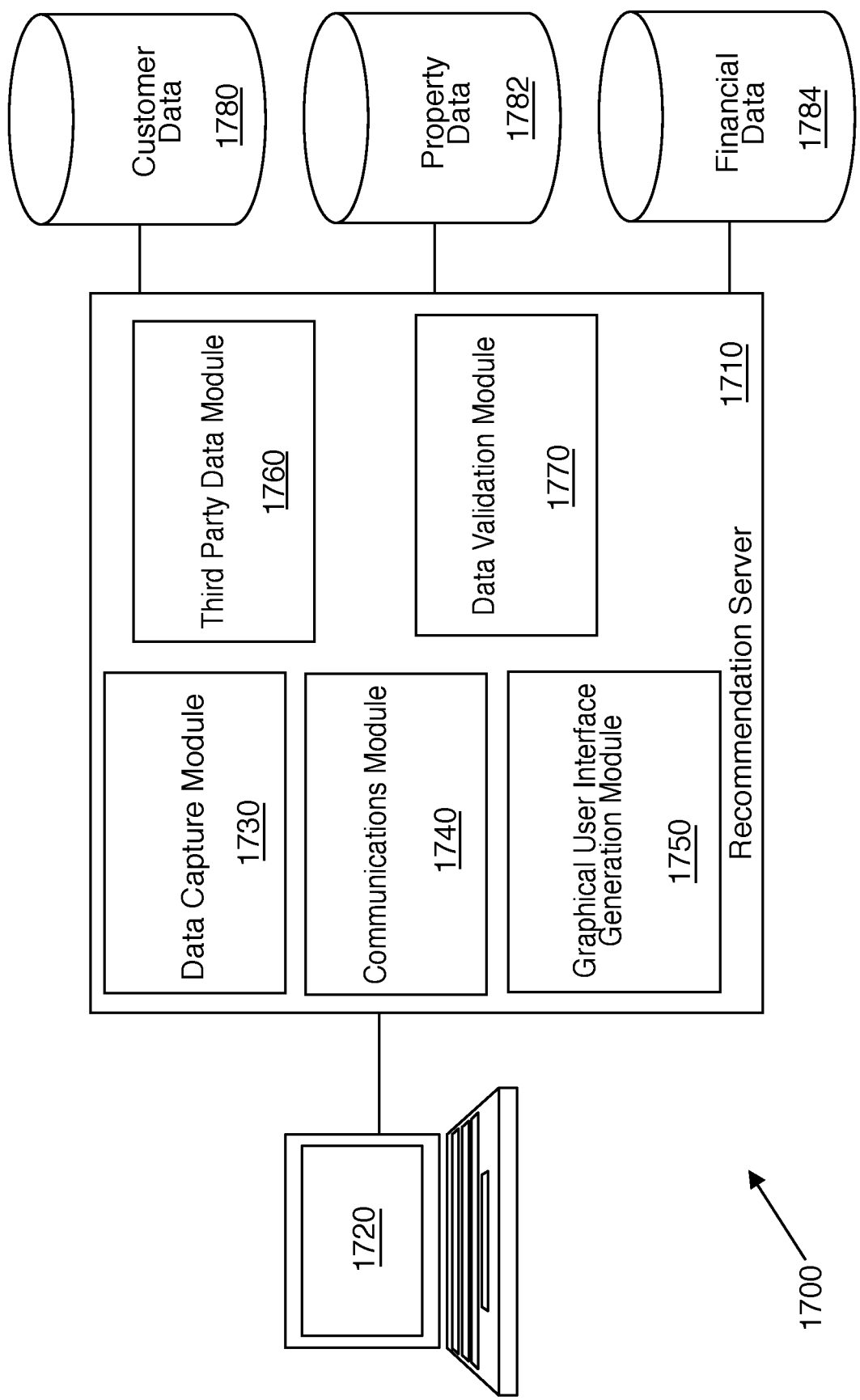
FIG. 17 is a partial functional block diagram of a computer system provided in accordance with some embodiments.

Referring to FIG. 17, in the present invention, another exemplary embodiment of a system 1700 of the present invention is shown. System 1700 includes a recommendation server 1710 connected in communication with an input/output or communication device 1720, which interacts with the recommendation server through one or more graphical user interfaces as described herein. The recommendation server 1710 includes one or more engines or modules for performing one or more steps or functions of the present invention. Preferably, the present invention is implemented as one or more modules of a computer software program in combination with one or more components of hardware. Such software programs will be used generally for the data processing done on the server side of the network where a client or customer has sent a request for data or information to a server. Typically, the program will be used in an Internet environment, where the server is a Web server and the request is formatted using HTTP (or HTTPS). Alternatively, the server may be in a corporate intranet, and extranet, or any other type of network. Use of the term "Internet" herein, when discussing processing associated with the user's request, includes these other network environments, unless otherwise stated. Additionally, a graphical user interface or financial processing module may be implemented as an intelligent hardware component incorporating circuitry comprising custom VLSI circuits or gate arrays, and/or off-the-shelf semiconductors such as logic chips, transistors, or other discrete components. A module may also be implemented in programmable hardware devices such as field programmable gate arrays, programmable array logic, programmable logic devices or the like.

Referring still to FIG. 17, recommendation server 1710 includes a data capture or input/output module 1730, a communications module 1740, a dynamic display generation or graphical user interface module 1750, a third party data module 1760 and a data validation module 1770. The third party data module 1760 is in further communication with a number of databases such as customer database 1780, property database 1782 and a financial information database 1784. Databases may include both internal and/or external/third party databases such as financial software databases, town property databases, payroll databases, tax databases, etc. One or more of the above modules, such as graphical user interface module 1750, third party data module 1760, and data validation module 1770, may also be implemented in software for execution by various types of computer processors. A module of executable code may, for instance, comprise one or more physical or logical blocks of computer instructions which may, for instance, be organized as an object, procedure, process or function. Nevertheless, the executables of an identified module need not be physically located together, but may comprise separate instructions stored in different locations which, when joined logically together, comprise the module and achieve the stated purpose for the module such as implementing the business rules logic prescribed by the present coverage recommendation system. In the present invention a module of executable code may be a compilation of many instructions, and may even be distributed over several different code partitions or segments, among different programs, and across several devices. Similarly, customer and insurance coverage information may be identified and illustrated herein within modules, and may be embodied in any suitable form and organized within any suitable type of data structure. Such data may be collected as a single data set, or may be distributed over different locations including over different storage devices, and may exist, at least partially, merely as electronic signals on a coverage recommendation system and/or network as shown and describe herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

In this manner, a system may be provided that allows incoming coverage requests to be processed with an increased level of automation, accuracy and efficiency. Note that the automation may lower transaction costs and these savings might be shared by all parties (e.g., the insured and the insurer).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the databases described herein may be combined or stored in external systems). Moreover, although examples of specific types of coverages involving automobiles have been used, embodiments of the present invention could be used with other types of insured items such as homes and other property.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system for delivering Web pages to Web browsers, comprising:

a computer server including a storage unit and a recommendation server, the recommendation server comprising a data input/output module, a communication module, a graphical user interface module, and a third party data module;

wherein the communication module is connected to a communications network, the communication module being in communication with at least one remote device and a plurality of external databases via the communications network;

wherein the third party data module communicates with the plurality of external databases to receive coverage guidelines for one or more coverage parameters for a property/casualty insurance policy in a plurality of states;

wherein the storage unit stores the coverage guidelines for the plurality of states in a table;

wherein the graphical user interface module renders a dynamic web-based graphical user interface on the at least one remote device;

wherein the data input/output module communicates with the at least one remote device to receive state residence information via the dynamic web-based graphical user interface;

wherein the recommendation server identifies selected stored coverage guidelines from the table corresponding to the received state residence information;

wherein the data input/output module communicates with the at least one remote device to receive financial information about a consumer's income and another class of assets via the dynamic web-based graphical user interface;

wherein the recommendation server assigns a relative weight to the consumer's income and other class of assets;

wherein the recommendation server generates one or more recommended values for the one or more coverage parameters for the property/casualty insurance policy based at least in part on the financial information about the consumer's income and other class of assets received from the at least one remote device, the relative weight assigned to the consumer's income and other class of assets, and the identified coverage guidelines from the table corresponding to the received state residence information; and wherein the graphical user interface module displays on the dynamic web-based graphical user interface the recommended values for the one or more coverage parameters for the property/casualty insurance policy generated by the computer server.

2. The system of claim 1, wherein the recommendation server updates the display of the recommended values for the one or more coverage parameters on the dynamic web-based graphical user interface based on changes to the consumer's financial information and/or the consumer's state residence information received from the at least one remote device.

3. The system of claim 1, wherein the recommendation server is configured to update the recommended values for the one or more coverage parameters for the property/casualty insurance policy as the financial information about the consumer's income and other class of assets received from the at least one remote device is updated.

4. The system of claim 1, wherein the financial information about the consumer's other class of assets received from the at least one remote device is selected from the group including home value, home equity, personal property value, retirement accounts value, and savings amount.

5. The system of claim 1, wherein the computer server is in communication with at least one external database via the communications network;
wherein the computer server is configured to query the at least one external database for financial information about the consumer's income and other class of assets; and
wherein the computer server is configured to generate the one or more recommended values for the one or more coverage parameters for the property/casualty insurance policy based at least in part on the financial information about the consumer's income and other class of assets received from the at least one remote device and/or the financial information about the consumer's income and other class of assets queried from the at least one external database.

6. The system of claim 5, wherein the at least one external database is a personal finance program database, a property valuation database, a motor vehicle registry database, and a credit database.

7. The system of claim 5, wherein the computer processor is configured to supplement the financial information about the consumer's income and other class of assets received from the at least one remote device with the financial information about the consumer's income and other class of assets queried from the at least one external database.

8. The system of claim 5, wherein the recommendation server further comprises a data validation module that validates the financial information about the consumer's income and other class of assets received from the at least one remote device by using the financial information about the consumer's income and other class of assets queried from the at least one external database.

9. A computer-implemented method for delivering Web pages to Web browsers, comprising:
providing a computer server including a storage unit and a recommendation server, the recommendation server comprising a data input/output module, a communication module, a graphical user interface module, and a third party data module;
the communication module communicating with a remote device and a plurality of external databases via a communications network;
the third party data module communicating with the plurality of external databases to receive coverage guidelines for one or more coverage parameters for a property/casualty insurance policy in a plurality of states;
the storage unit storing the coverage guidelines for the plurality of states in a table;
the graphical user interface module rendering a dynamic web-based graphical user interface on the at least one remote device;
the data input/output module communicating with the at least one remote device to receive state residence information via the dynamic web-based graphical user interface;
the recommendation server identifying selected stored coverage guidelines from the table corresponding to the received state residence information;
the data input/output module communicating with the remote device to receive financial information about a consumer's income and another class of assets via the dynamic web-based graphical user interface;
the recommendation server assigning a relative weight to the consumer's income and other class of assets;
the recommendation server generating one or more recommended values for the one or more coverage parameters for the property/casualty insurance policy based at least in part on the financial information about the consumer's income and other class of assets received from the at least one remote device, the relative weight assigned to the consumer's income and other class of assets, and the identified coverage guidelines from the table corresponding to the received state residence information; and
the graphical user interface module displaying on the dynamic web-based graphical user interface the one or more recommended values for one or more coverage parameters generated by the computer server.

10. The method of claim 9 further comprising the recommendation server updating the display of the recommended values for the one or more coverage parameters for the property/casualty insurance policy on the dynamic web-based graphical user interface based on changes to the consumer's financial information and/or the consumer's state residence information received from the at least one remote device.

11. The method of claim 9 further comprising the computer server updating the recommended values for the one or more coverage parameters for the property/casualty insurance policy as the financial information about the consumer's income and other class of assets received from the remote device is updated.

12. The method of claim 9, wherein the financial information about the consumer's income and other class of assets received from the remote device is comprised of at least two or more of income, home value, home equity, personal property value, retirement accounts value, and savings amount.

13. The method of claim 9 further comprising:
the computer server querying an external database for financial information about the consumer's income and other class of assets; and
the computer server generating the one or more recommended values for the one or more coverage parameters for the property/casualty insurance policy based at least in part on the financial information about the consumer's income and other class of assets received from the remote device and/or the financial information about the consumer's income and other class of assets queried from the external database.

14. The method of claim 13, wherein the external database is a personal finance program database, a property valuation database, a motor vehicle registry database, or a credit database.

15. The method of claim 13 further comprising the computer server supplementing the financial information about the consumer's income and other class of assets received from the remote device with the financial information about the consumer's income and other class of assets queried from the external database.

16. The method of claim 13 wherein the recommendation server further comprises a data validation module that validates the financial information about the consumer's income and other class of assets received from the remote device by using the financial information about the consumer's income and other class of assets queried from the external database.

17. A system for delivering Web pages to Web browsers, comprising:
- a communication device to receive and transmit information;
  - a recommendation server coupled to the communication device and a plurality of external databases, the recommendation server comprising a data input/output module, a graphical user interface module, and a third party data module; and
  - a storage device in communication with the recommendation server;
- wherein the third party data module communicates with the plurality of external databases to receive coverage guidelines for one or more coverage parameters for a property/casualty insurance policy in a plurality of states;
- wherein the storage device stores the coverage guidelines for the plurality of states in a table;
  - wherein the graphical user interface module renders a dynamic web-based graphical user interface on the at least one remote device;
  - wherein the data input/output module communicates with the at least one remote device to receive state residence information via the dynamic web-based graphical user interface;
  - wherein the recommendation server identifies selected stored coverage guidelines from the table corresponding to the received state residence information;
  - wherein the data input/output module communicates with the at least one remote device to receive financial information about a consumer's income and another class of assets via the dynamic web-based graphical user interface;
- wherein the recommendation server generates one or more recommended values for the one or more coverage parameters for the property/casualty insurance policy based at least in part on the financial information about the consumer's income and other class of assets received from the at least one remote device, the relative weight assigned to the consumer's income and other class of assets, and the identified coverage guidelines from the table corresponding to the received state residence information; and
- wherein the graphical user interface module renders on the dynamic web-based graphical user interface the recommended values for the one or more coverage parameters for the property/casualty insurance policy generated by the processor.

18. The system of claim 17, wherein the recommendation server further comprises a data validation module that queries at least one external database for financial information about the consumer's income and other class of assets; and
- wherein the recommendation server generates the one or more recommended values for the one or more insurance coverage parameters based at least in part on the financial information about the consumer's income and other class of assets received from the at least one remote device and/or the financial information about the consumer's income and other class of assets queried from the at least one external database.

19. The system of claim 17, wherein the financial information about the consumer other class of assets received from the at least one remote device is selected from the group including home value, home equity, personal property value, retirement accounts value, and savings amount.

20. The system of claim 17, wherein the data input/output module receives a coverage recommendation selection from the at least one remote device; and wherein the recommendation server generates one or more post recommendation communications via the communication device.

* * * * *